UNITED STATES PATENT OFFICE.

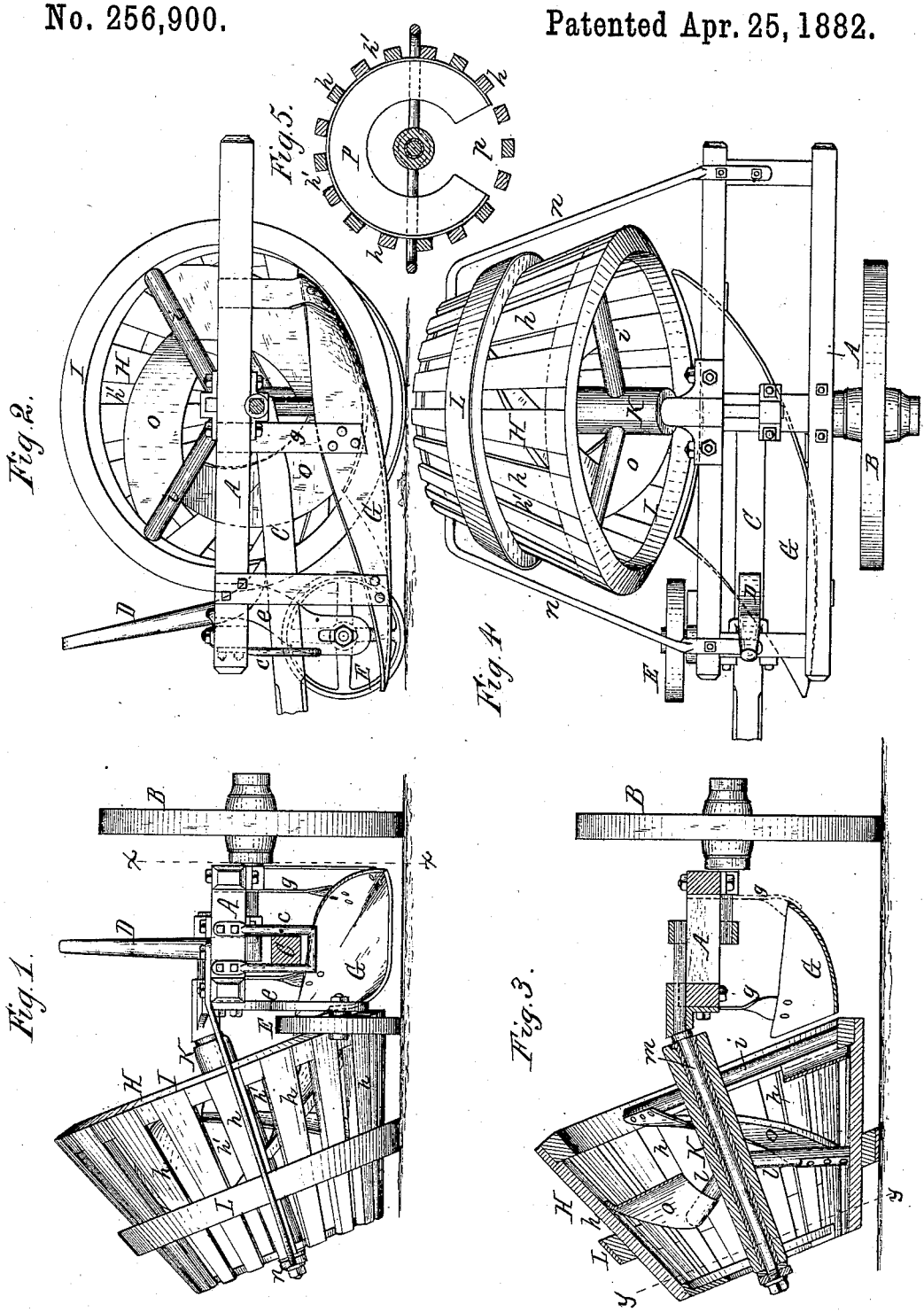

LOREN G. KELSEY, OF MARILLA, NEW YORK.

POTATO-DIGGER.

SPECIFICATION forming part of Letters Patent No. 256,900, dated April 25, 1882.

Application filed September 13, 1881. (No model.)

*To all whom it may concern:*

Be it known that I, LOREN G. KELSEY, of Marilla, in the county of Erie and State of New York, have invented new and useful Improvements in Potato-Diggers, of which the following is a specification.

My invention relates to that class of potato-diggers which are provided with a plow, whereby the potatoes are loosened and elevated, and a rotating cage into which the potatoes are discharged from the plow, and in which they are separated from the adhering earth.

The object of my invention is to facilitate and expedite the operation of separating the potatoes from the earth adhering thereto or mixed therewith, and to so discharge the potatoes that they can be conveniently collected.

My invention consists to that end of the peculiar construction of the separating mechanism, as hereinafter fully described, and pointed out in the claims.

In the accompanying drawings, Figure 1 is a front elevation of my improved potato-digger. Fig. 2 is a sectional elevation in line $xx$, Fig. 1. Fig. 3 is a cross-section of the machine; Fig. 4, a top plan view thereof. Fig. 5 is a cross-section in line $yy$, Fig. 3.

Like letters of reference refer to like parts in each of the figures.

A represents the frame of the machine, and B the large wheel arranged on one side of the frame and turning on an axle secured to the frame.

C represents the draft-pole, hinged with its rear end to the frame, near the middle thereof, and guided at its front end in a depending staple or clevis, $c$.

D represents a hand-lever pivoted to the frame A and bearing with its lower end upon the pole C, so that by swinging the lever forward or backward the front end of the frame A may be depressed or raised, as may be desired.

E represents a small supporting-wheel attached to a bracket, $e$, depending from the forward end of the frame A, the two wheels B and E being arranged on opposite sides of the frame.

G represents the plow, arranged underneath the frame A and attached thereto by means of rods or bars $g$.

H represents the rotating cage, arranged on one side of the frame A, in rear of the small wheel E and opposite the large wheel B. The cage H is composed of a series of bars or staves, $h$, arranged in the form of a truncated cone, with intervening spaces, $h'$, which are large enough to permit the escape of the earth, but which retain the potatoes. The inner ends of the staves $h$ are attached to a ring, I, which is connected with the hub K by spokes or arms $i$. The staves $h$ are also connected near their middle by a ring or tire, L, which surrounds the staves, and which runs upon the ground. This tire is also connected with the hub K by spokes or arms $l$. The cage H faces with its large open inner end the frame A, and its axis is arranged at right angles to the line of draft and inclines outwardly, so that the lowest stave in the cage is in a horizontal position, or thereabout, as shown in Fig. 1. The hub K of the cage turns on an axle, $m$, which is inclined, as above described, and which is secured with its inner end to the frame A. The outer end of the axle $m$ may be supported in a frame, $n$, the ends of which are secured to the frame A, as shown.

The plow G is so formed that its point or front end enters the hill and picks up the potatoes and the earth adhering thereto or mixed therewith. The plowshare rises from the point, and is so curved as to conduct and discharge the potatoes and earth into the inner open end of the cage H.

$o$ represents one or more screw-blades, arranged in the cage H in such manner that they propel the material from the inner toward the outer end of the cage. These blades are attached to the spokes or staves of the cage in any suitable manner.

P represents a flange or ring-segment, secured to the inner side of the cage at its outer end, whereby the potatoes are prevented from escaping from the outer end of the cage, except when the opening $p$ between the ends of the flange reaches its lowest position. By this means the potatoes are discharged from the cage at intervals in greater or less quantities at a time, which enables them to be more readily picked up than when they are delivered in a continuous thin stream. The arrangement of the staves $h$ of the cage in the form of a truncated cone gives the material in the cage a tendency to travel toward the outer or discharge end of the cage as the staves assume an outwardly-inclined position, gradually increasing in pitch from the bottom to the top of the cage. The central opening around the axle at the discharge end of the cage should be large enough to permit the free escape of vines, weeds, &c.

I claim as my invention—

1. In a potato-digger, the combination, with a wheeled frame, A, of the downwardly-inclined axle $m$, projecting laterally from the wheeled frame, a cage, H, having the form of a truncated cone, mounted on said axle and running with its lower side upon the ground, a plow, G, which delivers the potatoes and earth into the inner end of the cage, and a discharge-opening formed in the outer end of the cage H, through which the potatoes freed from the earth are delivered upon the surface of the ground, substantially as set forth.

2. In a potato-digger, the combination, with the cage H, of a stop-flange, P, and a discharge-opening, $p$, arranged at its discharge end, whereby the potatoes are temporarily retained in the cage and discharged therefrom at intervals, substantially as set forth.

3. In a potato-digger, the combination, with the cage H, of a stop-flange, P, and a discharge-opening, $p$, arranged at its discharge end, whereby the potatoes are discharged at intervals, and screw-blades $o$, whereby the material is propelled toward the discharge-opening, substantially as set forth.

LOREN G. KELSEY.

Witnesses:
JNO. J. BONNER,
CHAS. J. BUCHHEIT.